(12) United States Patent
Pyles et al.

(10) Patent No.: US 7,000,500 B2
(45) Date of Patent: Feb. 21, 2006

(54) BICYCLE PEDAL WITH A SELF-ADJUSTABLE RETAINER FOR FASTENING ONE FOOT OF A RIDER TO A FOOT-SUPPORTING PORTION

(75) Inventors: Nathan Pyles, Lake Mills, WI (US); Matthew J. Poster, Madison, WI (US); Chris Cox, Lake Mills, WI (US); Joe Newman, Santa Fe, NM (US)

(73) Assignee: Johnson Tech. Co., Ltd., Taichung Hsien (TW)

( * ) Notice: Subject to any disclaimer, the term of this patent is extended or adjusted under 35 U.S.C. 154(b) by 437 days.

(21) Appl. No.: 10/436,315

(22) Filed: May 12, 2003

(65) Prior Publication Data

US 2004/0226401 A1 Nov. 18, 2004

(51) Int. Cl.
*G05G 1/14* (2006.01)
(52) U.S. Cl. .................................... 74/594.6
(58) Field of Classification Search .... 74/594.4–594.7; D12/115, 125; 36/131
See application file for complete search history.

(56) References Cited

U.S. PATENT DOCUMENTS

| | | | | |
|---|---|---|---|---|
| 4,200,005 A | * | 4/1980 | Mohr | 74/594.6 |
| 4,206,636 A | * | 6/1980 | Hendrix | 73/132 |
| 4,442,732 A | * | 4/1984 | Okajima | 74/594.5 |
| 4,856,211 A | * | 8/1989 | Phillips | 36/131 |
| 5,097,687 A | * | 3/1992 | Turrin et al. | 74/594.6 |
| 6,510,764 B1 | * | 1/2003 | Vito | 74/594.6 |
| 2003/0092536 A1 | * | 5/2003 | Romanelli et al. | 482/60 |
| 2003/0114275 A1 | * | 6/2003 | Falbo et al. | 482/57 |
| 2004/0007090 A1 | * | 1/2004 | Liou | 74/594.6 |

* cited by examiner

*Primary Examiner*—Chong H. Kim
(74) *Attorney, Agent, or Firm*—Ohlandt, Greeley, Ruggiero & Perle, L.L.P.

(57) ABSTRACT

A bicycle pedal has a foot-supporting portion and a retainer that includes flexible first and second retaining bands, an elongated resilient connecting member, and a flexible sleeve. The first and second retaining bands extend respectively from two opposite sides of the foot-supporting portion. The connecting member has two ends fastened respectively to the first and second retaining bands so that engagement band portions of the first and second retaining bands are movable away from each other. The sleeve is disposed around the engagement band portions of the first and second retaining bands. When one foot of a rider is inserted into a space between the sleeve and the foot-supporting portion, the connecting member is stretched automatically to an extent corresponding to the size of the foot so as to clamp the foot between the sleeve and the foot-supporting portion.

5 Claims, 7 Drawing Sheets

BICYCLE PEDAL WITH A SELF-ADJUSTABLE RETAINER FOR FASTENING ONE FOOT OF A RIDER TO A FOOT-SUPPORTING PORTION

BACKGROUND OF THE INVENTION

1. Field of the Invention

This invention relates to a bicycle pedal, and more particularly to a bicycle pedal that includes a self-adjustable retainer, which can fasten one foot of a rider to a foot-supporting portion.

2. Description of the Related Art

Referring to FIG. 1, a first conventional bicycle pedal 10 is shown to include a pedal body 11, two retaining bands 12, 13 respectively extending from two opposite sides of the pedal body 11, and a hook-and-loop band set 14 interconnecting the retaining bands 12, 13. As the relative position between the retaining bands 12, 13 has to be adjusted manually, it is inconvenient to fasten one foot of the rider to the bicycle pedal 10.

Referring to FIG. 2, a second conventional bicycle pedal 20 is shown to include a pedal body 21 that is formed with two mushroom-shaped snap fasteners 22, 23 at two opposite sides thereof, and a retaining band 24 that has first and second end portions 241, 242, each of which is formed with a row of positioning holes 2411, 2421. Each of the snap fasteners 22, 23 is inserted into a selected one of the positioning holes 2411, 2421. In use, As the positions of the snap fasteners 22, 23 relative to the positioning holes 2411, 2421 have to be adjusted manually, it is also inconvenient to fasten one foot of the rider to the pedal body 20.

SUMMARY OF THE INVENTION

The object of this invention is to provide a bicycle pedal that includes a self-adjustable retainer, which can fasten one foot of a rider to a foot-supporting portion.

According to this invention, a bicycle pedal has a foot-supporting portion and a retainer that includes flexible first and second retaining bands, an elongated resilient connecting member, and a flexible sleeve. The first and second retaining bands extend respectively from two opposite sides of the foot-supporting portion. The connecting member has two ends fastened respectively to the first and second retaining bands that engagement band portions of the first and second retaining bands are movable away from each other. The sleeve is disposed around the engagement band portions of the first and second retaining bands. When one foot of a rider is inserted into a space between the sleeve and the foot-supporting portion, the connecting member is stretched automatically to an extent corresponding to the size of the foot so as to clamp the foot between the sleeve and the foot-supporting portion. As such, there is no need to adjust manually the relative position between the first and second retaining bands.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
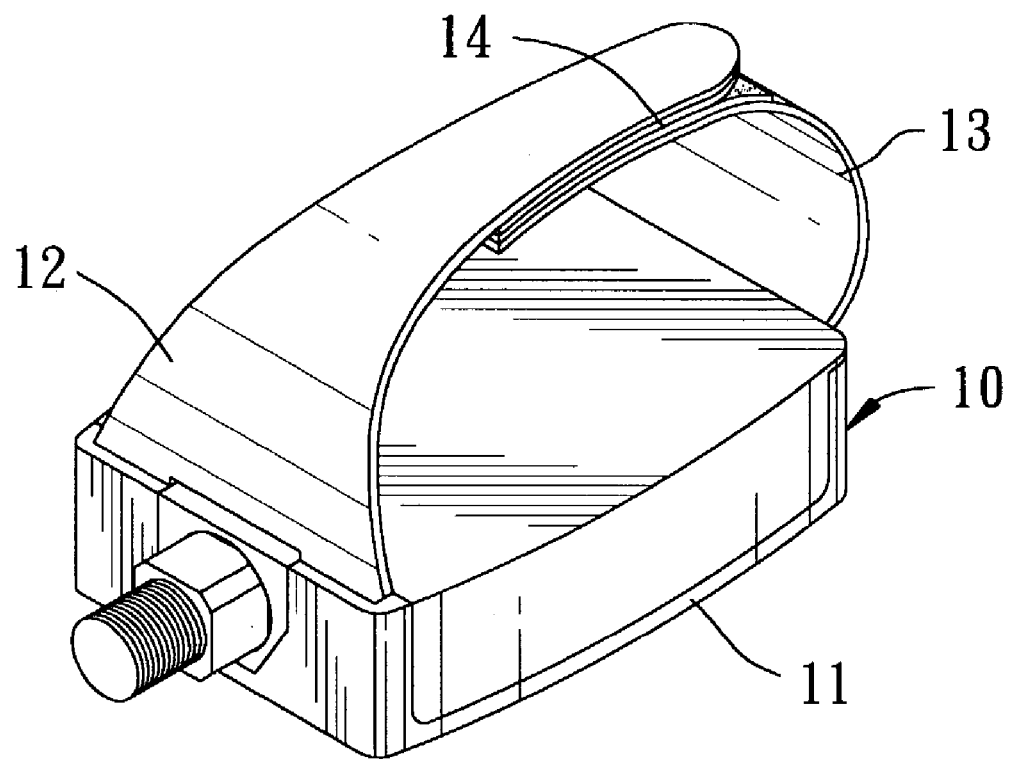
FIG. 1 is a perspective view of a first conventional bicycle pedal.
Figure 2:
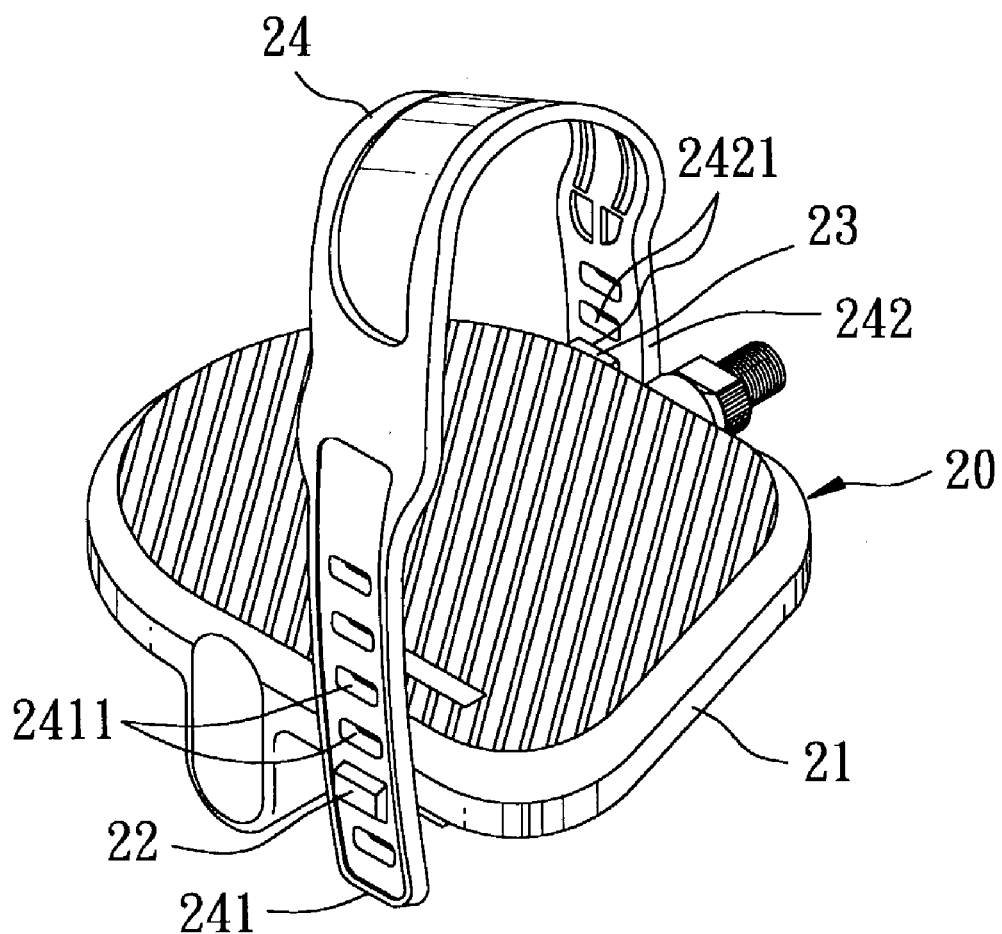
FIG. 2 is a perspective view of a second conventional bicycle pedal.
Figure 3:
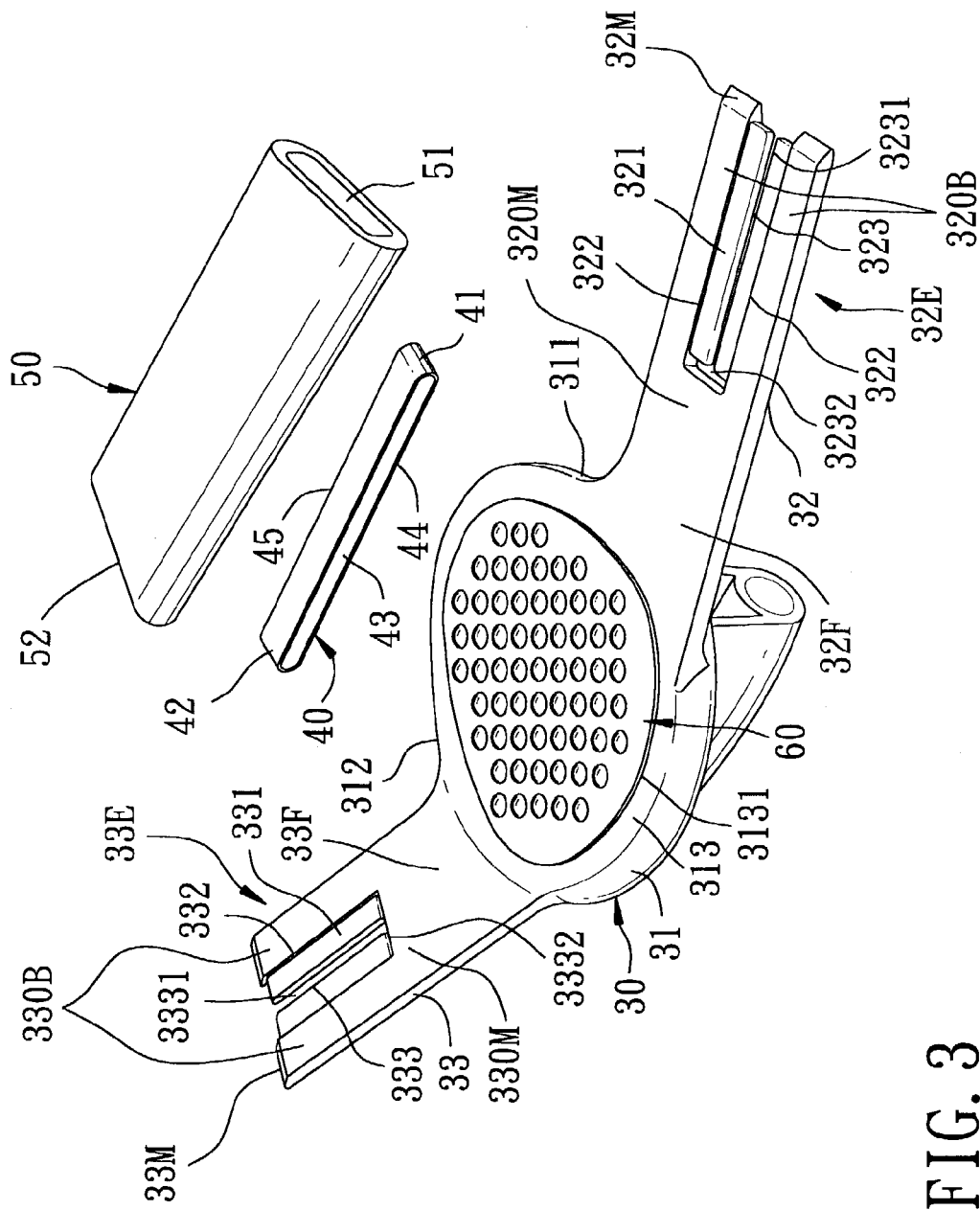
FIG. 3 is an exploded perspective view of the preferred embodiment of a bicycle pedal according to this invention.
Figure 4:
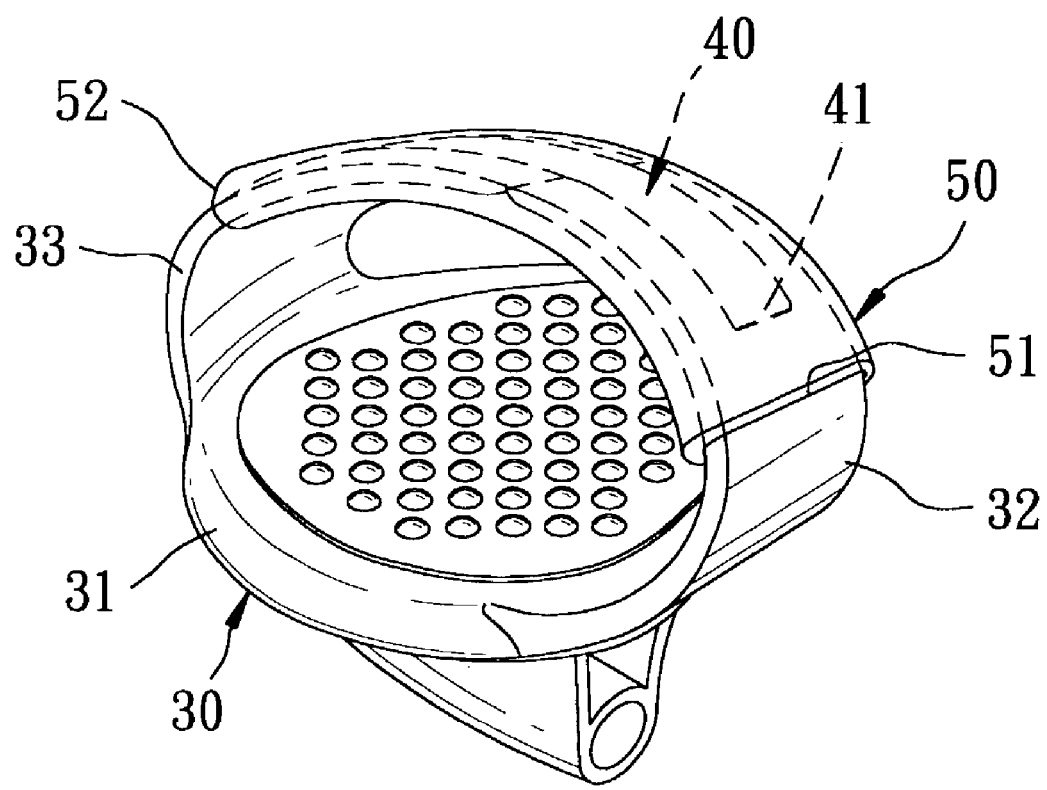
FIG. 4 is an assembled perspective view of the preferred embodiment.
Figure 5:
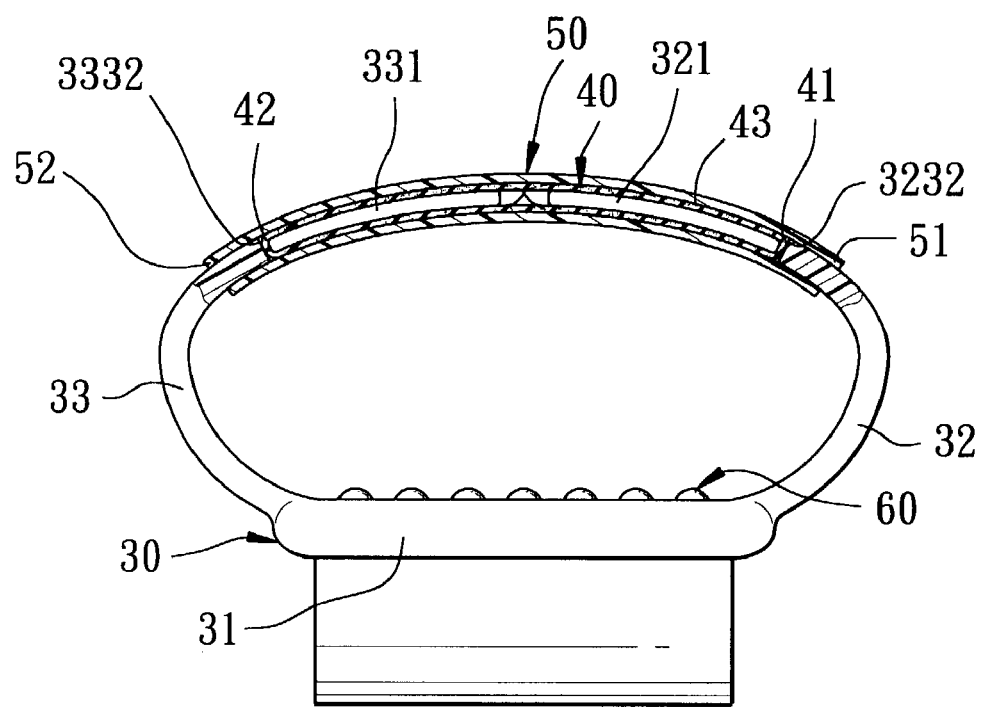
FIG. 5 is a partly sectional front side view of the preferred embodiment when it is idle.

Referring to FIGS. 3, 4, and 5, the preferred embodiment of a bicycle pedal according to this invention is adapted to support one foot of a rider thereon. The bicycle pedal is shown to include a pedal body 30, an elongated resilient connecting member 40, and a flexible sleeve 50.

The pedal body 30 has a foot-supporting portion 31 and first and second retaining bands 32, 33 extending respectively and integrally from two opposite sides 311, 312 of the foot-supporting portion 31. The first and second retaining bands 32, 33, the resilient connecting member 40, and the sleeve 50 cooperatively constitute a self-adjustable retainer for fastening the foot of the rider to the foot-supporting portion 31. Each of the first and second retaining bands 32, 33 is generally U-shaped, and has a fixed end (32F, 33F) that is formed integrally with the foot-supporting portion 31, a movable end (32M, 33M), a main band portion (320M, 330M) in proximity to the fixed end (32F, 33F), and an engagement band portion (32E, 33E) in proximity to the movable end (32M, 33M).

The resilient connecting member 40 has a first end 41 fastened to the first retaining band 32, a second end 42 fastened to the second retaining band 33 so that the movable ends (32M, 33M) of the first and second retaining bands 32, 33 abut against each other and so that the engagement band portions (32E, 33E) of the first and second retaining bands 32, 33 are movable away from each other.

The sleeve 50 is disposed around the engagement band portions (32E, 33E) of the first and second retaining bands 32, 33 and the resilient connecting member 40, and has a first end 51 sleeved around the main band portion (320M) of the first retaining band 32, and a second end 52 sleeved around the main band portion (330M) of the second retaining band 33. When the foot is inserted into a space between the sleeve 50 and the foot-supporting portion 31 of the pedal body 30, the resilient connecting member 40 is stretched automatically to an extent corresponding to the size of the foot so as to clamp the foot between the sleeve 50 and the foot-supporting portion 31 of the pedal body 30, thereby retaining the foot on the pedal body 30.

Figure 6:
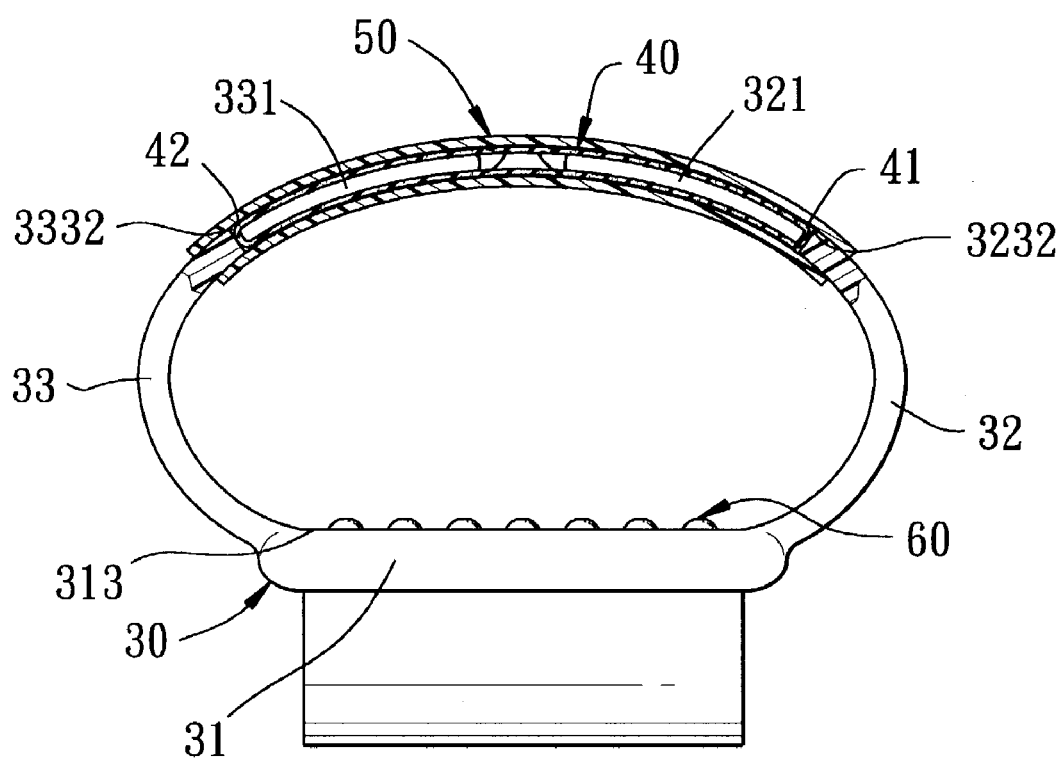
FIG. 6 is a partly sectional front side view of the preferred embodiment when it is in use.
Figure 7:
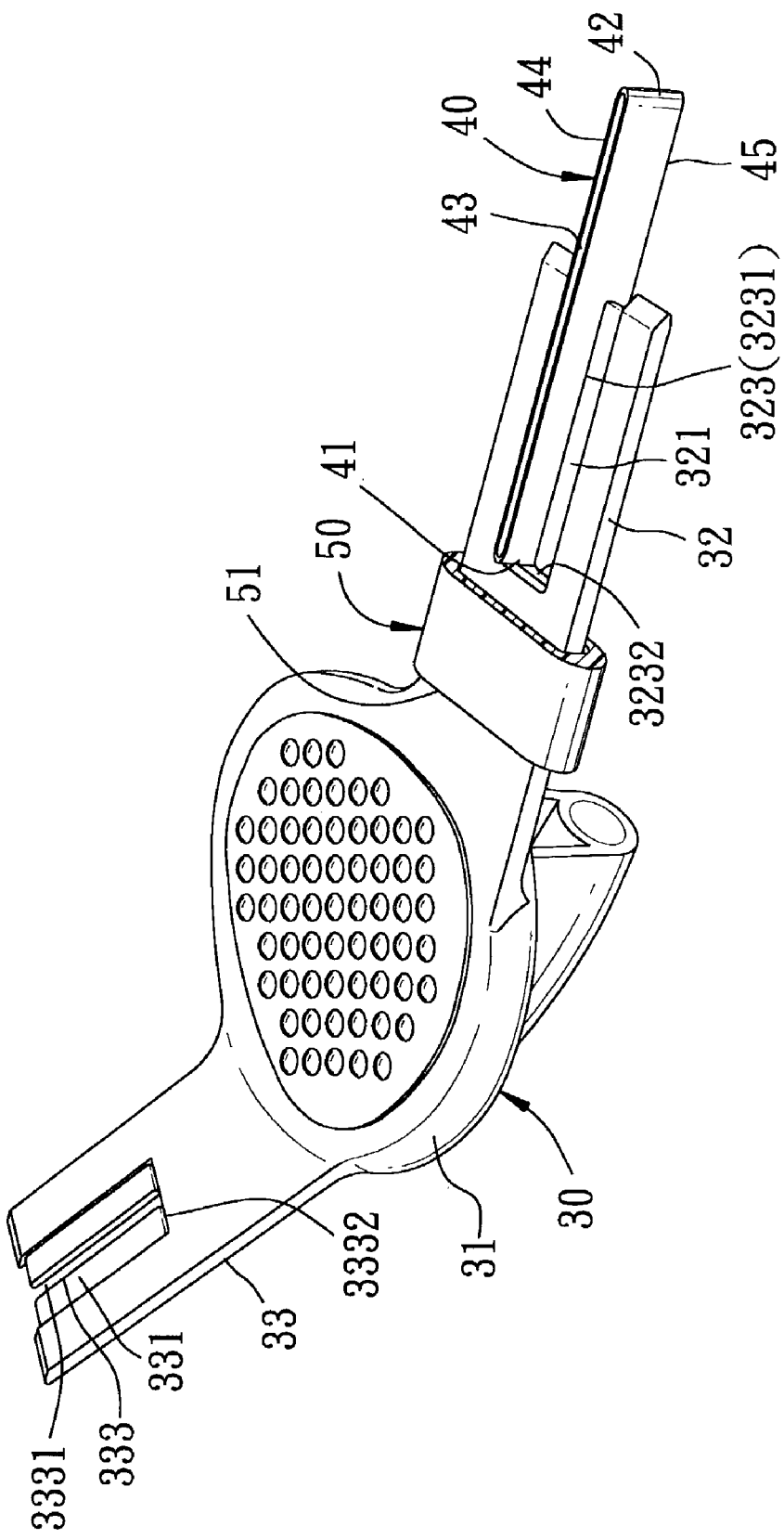
FIG. 7 is a perspective view of the preferred embodiment, illustrating how a resilient connecting member is inserted into a T-shaped slot in a first retaining band.

Each of the engagement band portions (32E, 33E) of the first and second retaining bands 32, 33 includes two parallel branches (320B, 330B) that extend respectively from two opposite side portions of the main band portion (320M, 330M) of a corresponding one of the first and second retaining bands 32, 33 to the movable end (32M, 33M) of the corresponding one of the first and second retaining bands 32, 33 and that are formed respectively with aligned ribs 321, 331, which extend toward each other and which are spaced apart from each other and from the main band portion (320M, 330M) of the corresponding one of the first and second retaining bands 32, 33 so as to define a T-shaped slot 323, 333 among the branches (320B, 330B) and the corresponding main band portion (320M, 330M). Each of the T-shaped slots 323, 333 has a longitudinal slot portion 3231, 3331 that is formed between the ribs 321, 331 of the corresponding one of the first and second retaining bands 32, 33, and a transverse slot portion 3232, 3332 that is formed between the main band portion (320M, 330M) and the ribs 321, 331 of the corresponding one of the first and second retaining bands 32, 33 and that has a middle portion which is communicated with an end of the longitudinal slot portion 3231, 3331. The resilient connecting member 40 is configured as an annular band, and has two opposite side portions 44, 45, each of which is sleeved on a corresponding one of the ribs 321 of the first retaining band 32 and a corresponding one of the ribs 331 of the second retaining band 33. The first end 41 of the resilient connecting member 40 is confined within the transverse slot portion 3232 of the T-shaped slot 323 in the first retaining band 32. The second end 42 of the resilient connecting member 40 is confined within the transverse slot portion 3332 of the T-shaped slot 333 in the second retaining band 33. The ribs 321 of the first retaining band 32 are spaced apart from the ribs 331 of the second retaining band 33. As such, when the foot is inserted into the space between the sleeve 50 and the foot-supporting portion 31 of the pedal body 30, the ribs 321 of the first retaining band 32 move away from the ribs 331 of the second retaining band 33 from the position shown in FIG. 5 to that shown in FIG. 6, thereby stretching the resilient connecting member 40.

The ribs 321, 331 of the first and second retaining bands 32, 33 are thinner than the branches (320B, 330B) of the first and second retaining bands 32, 33 so as to define a shoulder 322, 332 between each of the ribs 321, 331 of the first and second retaining bands 32, 33 and a corresponding one of the branches (320B, 330B) of the first and second retaining bands 32, 33, thereby confining the resilient connecting member 40 among the shoulders 322, 332 of the first and second retaining bands 32, 33.

To enhance the comfort of the foot, a resilient cushion 60 is attached fixedly to the foot-supporting portion 31 of the pedal body 30 so as to support the foot thereon. The resilient cushion 60 is generally shaped as a plate. The foot-supporting portion 31 of the pedal body 30 has a horizontal top surface 313 that is formed with a depression 3131 for receiving the resilient cushion 60 fittingly.

With this invention thus explained, it is apparent that numerous modifications and variations can be made without departing the scope and spirit of this invention. It is therefore intended that this invention be limited only as indicated by the appended claims.

We claim:

1. A bicycle pedal adapted to support one foot of a rider thereon, said bicycle pedal comprising:
   a pedal body having a foot-supporting portion, and flexible first and second retaining bands extending respectively and integrally from two opposite sides of said foot-supporting portion, each of said first and second retaining bands having a fixed end that is formed integrally with said foot-supporting portion, a movable end, a main band portion in proximity to said fixed end, and an engagement band portion in proximity to said movable end;
   an elongated resilient connecting member having a first end fastened to said first retaining band, and a second end fastened to said second retaining band so that said engagement band portions of said first and second retaining bands are movable away from each other; and
   a flexible sleeve disposed around said engagement band portions of said first and second retaining bands and said resilient connecting member such that said resilient connecting member is stretched automatically to an extent corresponding to the size of the foot when the foot is inserted into a space between said sleeve and said foot-supporting portion of said pedal body so as to clamp the foot between said sleeve and said foot-supporting portion of said pedal body, thereby retaining the foot on the pedal body.

2. The bicycle pedal as claimed in claim 1, wherein each of said first and second retaining bands is generally U-shaped, said movable ends of said first and second retaining bands abutting against each other, each of said engagement band portions of said first and second retaining bands including two parallel branches that extend respectively from two opposite side portions of said main band portion of a corresponding one of said first and second retaining bands to said movable end of the corresponding one of said first and second retaining bands and that are formed respectively with aligned ribs, which extend toward each other and which are spaced apart from each other and from said main band portion of the corresponding one of said first and second retaining bands so as to define a T-shaped slot among said branches and said main band portion of a corresponding one of said first and second retaining bands, each of said T-shaped slots having a longitudinal slot portion that is formed between said ribs of the corresponding one of said first and second retaining bands, and a transverse slot portion that is formed between said main band portion and said ribs of the corresponding one of said first and second retaining bands and that has a middle portion which is communicated with an end of said longitudinal slot portion, said resilient connecting member being configured as an annular band and having two opposite side portions, each of which is sleeved on a corresponding one of said ribs of said first retaining band and a corresponding one of said ribs of said second retaining band, said first end of said resilient connecting member being confined within said transverse slot portion of said T-shaped slot in said first retaining band, said second end of said resilient member being confined within said transverse slot portion of said T-shaped slot in said second retaining band, whereby, when the foot is inserted into the space between said sleeve and said foot-supporting portion of said pedal body, said ribs of said first retaining band move away from said ribs of said second retaining band, thereby stretching said resilient connecting member.

3. The bicycle pedal as claimed in claim 1, wherein said ribs of said first and second retaining bands are thinner than said branches of said first and second retaining bands so as to define a shoulder between each of said ribs of said first and second retaining bands and a corresponding one of said branches of said first and second retaining bands, thereby confining said resilient connecting member among said shoulders of said first and second retaining bands.

4. The bicycle pedal as claimed in claim 1, further comprising a resilient cushion that is attached fixedly to said foot-supporting portion of said pedal body so as to support the foot thereon.

5. The bicycle pedal as claimed in claim 4, wherein said resilient cushion is generally shaped as a plate, said foot-supporting portion of said pedal body having a horizontal top surface that is formed with a depression for receiving said resilient cushion fittingly.

\* \* \* \* \*